(12) United States Patent
Li (10) Patent No.: US 10,997,393 B2
(45) Date of Patent: May 4, 2021

(54) METHOD AND APPARATUS FOR IDENTIFYING FINGERPRINT LOGO AND ELECTRONIC DEVICE

(71) Applicant: SHENZHEN GOODIX TECHNOLOGY CO., LTD., Shenzhen (CN)

(72) Inventor: Yong Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 25 days.

(21) Appl. No.: 16/706,634

(22) Filed: Dec. 6, 2019

(65) Prior Publication Data

US 2020/0134289 A1 Apr. 30, 2020

Related U.S. Application Data

(63) Continuation of application No. PCT/CN2018/113128, filed on Oct. 31, 2018.

(51) Int. Cl.
*G06K 9/00* (2006.01)

(52) U.S. Cl.
CPC ....... *G06K 9/00087* (2013.01); *G06K 9/0004* (2013.01)

(58) Field of Classification Search
CPC .................. G06K 9/00087; G06K 9/0004
See application file for complete search history.

(56) References Cited

U.S. PATENT DOCUMENTS

| 9,342,729 | B2 | 5/2016 | Kim et al. | |
|---|---|---|---|---|
| 10,165,108 | B1* | 12/2018 | Douglas | .............. H04W 12/065 |
| 10,615,239 | B2* | 4/2020 | Jin | ....................... H01L 27/3267 |
| 10,929,632 | B2* | 2/2021 | Shin | .................... G06K 9/00087 |
| 2014/0003679 | A1 | 1/2014 | Han et al. | |
| 2014/0153791 | A1 | 6/2014 | Kim et al. | |

(Continued)

FOREIGN PATENT DOCUMENTS

| CN | 106716431 A | 5/2017 |
|---|---|---|
| CN | 107067061 A | 8/2017 |

(Continued)

OTHER PUBLICATIONS

Xiaomeng Guo et al. "Fingerprint Pattern Identification and Classification," 2018 14th International Conference on Natural Computation, Fuzzy Systems and Knowledge Discovery (ICNC-FSKD), Jul. 30, 2018, 6 pages.

*Primary Examiner* — Utpal D Shah (74) *Attorney, Agent, or Firm* — Scully Scott Murphy & Presser (57) ABSTRACT

Provided are a method and apparatus for identifying a fingerprint logo and an electronic device. The method for identifying the fingerprint logo includes: acquiring, before an optical sensor captures a fingerprint image, first optical signals captured by the optical sensor in at least one first region respectively, where the first optical signals captured in the at least one first region form a first image, and the at least one first region corresponds to a partial region of a photosensitive surface of the optical sensor; and identifying whether there is a fingerprint logo for guiding a user to perform pressing in the first image according to the first optical signals captured in the at least one first region.

20 Claims, 5 Drawing Sheets

200

Acquiring, before an optical sensor captures a fingerprint image, first optical signals captured by the optical sensor in at least one first region respectively, where the first optical signals captured in the at least one first region form a first image, and the at least one first region corresponds to a partial region of a photosensitive surface of the optical sensor  — S210

Identifying whether there is a fingerprint logo for guiding a user to perform pressing in the first image according to the first optical signals captured in the at least one first region — S220

(56) References Cited

U.S. PATENT DOCUMENTS

| | | | |
|---|---|---|---|
| 2014/0301614 A1 | 10/2014 | Han et al. | |
| 2015/0139512 A1 | 5/2015 | Han et al. | |
| 2015/0169163 A1* | 6/2015 | Lee | G06F 3/0416 |
| | | | 715/769 |
| 2016/0283022 A1* | 9/2016 | Yang | G06F 21/32 |
| 2017/0262688 A1 | 9/2017 | Han et al. | |
| 2018/0150671 A1* | 5/2018 | Choo | H01L 27/323 |
| 2018/0218195 A1* | 8/2018 | Sheik-Nainar | G06K 9/001 |
| 2019/0019048 A1 | 1/2019 | Deng et al. | |
| 2019/0197288 A1 | 6/2019 | Han et al. | |
| 2019/0286295 A1* | 9/2019 | Yu | G06K 9/0004 |
| 2019/0295456 A1* | 9/2019 | Ling | G06K 9/00 |
| 2019/0340455 A1 | 11/2019 | Jung et al. | |

FOREIGN PATENT DOCUMENTS

| | | |
|---|---|---|
| CN | 107111763 A | 8/2017 |
| CN | 206400421 U | 8/2017 |
| CN | 107566628 A | 1/2018 |
| CN | 107704839 A | 2/2018 |
| CN | 108122476 A | 6/2018 |
| CN | 108171177 A | 6/2018 |
| CN | 108256415 A | 7/2018 |
| CN | 108334799 A | 7/2018 |
| CN | 108508620 A | 9/2018 |
| WO | 2018128422 A1 | 7/2018 |

\* cited by examiner

Acquiring, before an optical sensor captures a fingerprint image, first optical signals captured by the optical sensor in at least one first region respectively, where the first optical signals captured in the at least one first region form a first image, and the at least one first region corresponds to a partial region of a photosensitive surface of the optical sensor — S210

Identifying whether there is a fingerprint logo for guiding a user to perform pressing in the first image according to the first optical signals captured in the at least one first region — S220

FIG. 3

Type 1　　　　　Type 2

Type 3　　　　　Type 4

FIG. 11

METHOD AND APPARATUS FOR IDENTIFYING FINGERPRINT LOGO AND ELECTRONIC DEVICE

CROSS-REFERENCE TO RELATED APPLICATIONS

The present application is a continuation of international application No. PCT/CN2018/113128, filed on Oct. 31, 2018, which is hereby incorporated by reference in its entirety.

TECHNICAL FIELD

The present disclosure relates to the field of fingerprint identification, and more particularly, to a method and apparatus for identifying a fingerprint logo and an electronic device.

BACKGROUND

With rapid development of an electronic device industry, especially high-speed development of mobile communication devices (such as mobile phones), biometric identification technology has received more and more attention from people, and practical usage of more convenient under-screen biometric identification technology has become a popular requirement, for example, under-screen optical fingerprint identification technology under a screen of a liquid crystal display (LCD) and an organic light-emitting diode (OLED) display.

In the under-screen optical fingerprint identification technology, a part to be pressed is prompted on a display screen, and mainly includes two patterns: one is a fingerprint logo prompting a user to perform pressing, and the other is a pattern of a captured fingerprint image. If an optical fingerprint image contains logo information, false rejection rate (FRR) of fingerprint identification will be greatly affected. At current stage, by performing a fixed delay on a host end, a fingerprint image capturing command is issued only after the logo is completely eliminated. However, since the above method is a fixed delay method, a time point of logo elimination cannot be accurately known, so user experience is reduced.

SUMMARY

The present disclosure provides a method and apparatus for identifying a fingerprint logo and an electronic device. Before starting normal fingerprint image capturing, an image of a local region may be firstly captured to determine whether there is a fingerprint logo currently, thereby solving a problem that a fingerprint logo is contained in a fingerprint image, reducing a risk of false fingerprint identification, and meanwhile, reducing FRR and False Acceptance Rate (FAR).

In a first aspect, provided is a method for identifying a fingerprint logo, including:

acquiring, before an optical sensor captures a fingerprint image, first optical signals captured by the optical sensor in at least one first region respectively, where the first optical signals captured in the at least one first region form a first image, and the at least one first region corresponds to a partial region of a photosensitive surface of the optical sensor; and identifying whether there is a fingerprint logo for guiding a user to perform pressing in the first image according to the first optical signals captured in the at least one first region.

It should be noted that fingerprint image capturing is only performed after a fingerprint logo is determined to disappear.

Therefore, in a method for identifying a fingerprint logo provided by an embodiment of the present disclosure, before an optical sensor captures a fingerprint image, a first image may be acquired by the optical sensor, and whether there is a fingerprint logo for guiding a user to perform pressing is identified in the first image, and then fingerprint image capturing is performed after the fingerprint logo is determined to disappear, thereby solving a problem that a fingerprint logo is contained in a fingerprint image, reducing a risk of false fingerprint identification, and meanwhile, reducing FRR and FAR, and improving user experience.

It should be noted that the at least one first region corresponds to the partial region of the photosensitive surface of the optical sensor, that is, fingerprint logo identification may thus be implemented only through an image formed by an optical signal captured by an optical sensor in a local region, thereby improving user usage experience.

In some possible implementation manners, the identifying whether there is the fingerprint logo for guiding the user to perform pressing in the first image according to the first optical signals captured in the at least one first region includes:

determining light intensity information of the at least one first region respectively according to the first optical signals captured in the at least one first region; and determining that there is the fingerprint logo in the first image if there is light intensity information greater than a first threshold in the light intensity information of the at least one first region; or determining that there is not the fingerprint logo in the first image if there is not light intensity information greater than a first threshold in the light intensity information of the at least one first region.

Therefore, in the embodiment of the present disclosure, fingerprint logo identification can be implemented through a relationship between light intensity information of at least one first region and a first threshold.

In some possible implementation manners, the light intensity information is at least one of optical signal mean, optical signal standard deviation, optical signal variance, and optical signal weight ratio.

In some possible implementation manners, before determining the light intensity information of the at least one first region respectively, the method further includes:

performing consistency and/or binarization processing on the first optical signals captured in the at least one first region.

In some possible implementation manners, the method further includes:

configuring the first threshold.

In some possible implementation manners, the method further includes:

dividing each first region into a plurality of sub-regions, where each of the sub-regions corresponds to a plurality of pixel points of the optical sensor; and the identifying whether there is the fingerprint logo for guiding the user to perform pressing in the first image according to the first optical signals captured in the at least one first region includes:

determining difference information between different sub-regions of the plurality of sub-regions according to the first optical signals of each of the sub-regions; and identifying whether there is the fingerprint logo in the first image according to the difference information between the different sub-regions of the plurality of sub-regions.

It should be understood that each of sub-regions corresponds to a plurality of pixel points, and each of the pixel points captures a first optical signal, that is, first optical signals are captured in each of the sub-regions.

It should be noted that whether there is the fingerprint logo in the first image is identified according to the difference information between the different sub-regions of the first region. Certainly, fingerprint logo identification is performed between different sub-regions in each of at least one first region, and it can be confirmed that there is the fingerprint logo in the first image as long as the fingerprint logo is identified in any first region.

Therefore, in the embodiment of the present disclosure, fingerprint identification can be implemented through difference information between different sub-regions in the first region.

In some possible implementation manners, the determining the difference information between the different sub-regions of the plurality of sub-regions according to the first optical signals of each of the sub-regions includes:

determining light intensity information of each of the sub-regions according to the first optical signals of each of the sub-regions; and determining the difference information between the different sub-regions of the plurality of sub-regions according to the light intensity information of each of the sub-regions.

In some possible implementation manners, the light intensity information is at least one of optical signal mean, optical signal standard deviation, optical signal variance, and optical signal weight ratio.

In some possible implementation manners, before determining the light intensity information of each of the sub-regions, the method further includes:

performing consistency and/or binarization processing on the first optical signals captured in the plurality of sub-regions.

It should be understood that, upon determining the light intensity information, some specific algorithms are required to be combined. For example, when the light intensity information is optical signal weight ratio, assuming that there are sub-region 1 and sub-region 2, it needs to calculate weight of mean of an optical signal of the sub-region 1 greater than that of an optical signal of the sub-region 2. For another example, when the light intensity information is optical signal variance, assuming that there is a sub-region 1, it needs to calculate variance of an optical signal of the sub-region 1.

In some possible implementation manners, the plurality of sub-regions have different locations and/or shapes.

In some possible implementation manners, the fingerprint logo includes at least one type of fingerprint logo.

Therefore, in the embodiment of the present disclosure, at least one type of fingerprint logo can be identified, that is, fingerprint logos of different electronic devices may be compatible, and fingerprint logos of different models of the same electronic device may be compatible, and actual fingerprint logo types of different models may be adjusted to improve user experience.

In some possible implementation manners, the method further includes:

determining the at least one first region according to location information of the fingerprint logo and current type of the fingerprint logo.

For example, in combination with some specific location algorithms, and based on location information of the fingerprint logo and current type of the fingerprint logo, the at least one first region can be determined.

In some possible implementation manners, if there is not the fingerprint logo in the first image, the method further includes:

controlling the optical sensor to capture a fingerprint image.

In some possible implementation manners, if there is the fingerprint logo in the first image, the method further includes:

acquiring second optical signals captured by the optical sensor in the at least one first region respectively, where the second optical signals captured in the at least one first region form a second image; and identifying whether there is the fingerprint logo in the second image according to the second optical signals captured in the at least one first region.

Therefore, in the embodiment of the present disclosure, fingerprint logo disappearing time can be accurately determined, thereby avoiding a fingerprint logo contained in a captured fingerprint image, reducing a risk of false fingerprint identification, and meanwhile, reducing FRR.

Optionally, in the embodiment of the present disclosure, the method for identifying the fingerprint logo may be performed by a micro control unit (MCU) in a fingerprint module including an optical sensor. For example, the MCU may control the optical sensor to capture an optical signal (an image), and the MCU includes a memory for storing programs and data and a processor for calling and running the programs and the data stored in the memory, and the MCU is configured to perform the method in the first aspect or any of the possible implementation manners of the first aspect. By adopting the fingerprint logo identification method, software intervening is not needed, so that fingerprint logo identification can be realized without upper layer application perception.

It should be noted that the memory included in the above MCU may be a register, and the register may store some related algorithms for calculating mean, variance, standard deviation, and weight ratio, and may also store some algorithms for selection of a first region location, and may also store some parameter configuration information; and the processor in the above MCU calls related information in the register to perform the method in the first aspect or any of the possible implementation manners of the first aspect.

Optionally, in the embodiment of the present disclosure, the method for identifying the fingerprint logo may also be executed by a processor in an electronic device, for example, the processor executes the method in the first aspect or any of the possible implementation manners of the first aspect by some software running on the electronic device.

Optionally, in the embodiment of the present disclosure, the method for identifying the fingerprint logo may be the method in the first aspect or any of the possible implementation manners of the first aspect that is commonly executed by an MCU and a processor.

In a second aspect, provided is an apparatus for identifying a fingerprint logo, including:

an acquiring unit, configured to acquire, before an optical sensor captures a fingerprint image, first optical signals captured by the optical sensor in at least one first region respectively, where the first optical signals captured in the at least one first region form a first image, and the at least one first region corresponds to a partial region of a photosensitive surface of the optical sensor; and a processing unit, configured to identify whether there is a fingerprint logo for guiding a user to perform pressing in the first image according to the first optical signals captured in the at least one first region.

In some possible implementation manners, the processing unit is configured to:

determine light intensity information of the at least one first region respectively according to the first optical signals captured in the at least one first region; and determine that there is the fingerprint logo in the first image if there is light intensity information greater than a first threshold in the light intensity information of the at least one first region; or determine that there is not the fingerprint logo in the first image if there is not light intensity information greater than a first threshold in the light intensity information of the at least one first region.

In some possible implementation manners, before the processing unit determines the light intensity information of the at least one first region respectively, the processing unit is further configured to:

perform consistency and/or binarization processing on the first optical signals captured in the at least one first region.

In some possible implementation manners, the light intensity information is at least one of optical signal mean, optical signal standard deviation, optical signal variance, and optical signal weight ratio.

In some possible implementation manners, the processing unit is further configured to configure the first threshold.

In some possible implementation manners, the processing unit is further configured to divide each first region into a plurality of sub-regions, where each of the sub-regions corresponds to a plurality of pixel points of the optical sensor; and the processing unit is configured to:

determine difference information between different sub-regions of the plurality of sub-regions according to the first optical signals of each of the sub-regions; and identify whether there is the fingerprint logo in the first image according to the difference information between the different sub-regions of the plurality of sub-regions.

In some possible implementation manners, the processing unit is configured to:

determine light intensity information of each of the sub-regions according to the first optical signals of each of the sub-regions; and determine the difference information between the different sub-regions of the plurality of sub-regions according to the light intensity information of each of the sub-regions.

In some possible implementation manners, before the processing unit determines the light intensity information of each of the sub-regions, the processing unit is further configured to perform consistency and/or binarization processing on the first optical signals captured in the plurality of sub-regions.

In some possible implementation manners, the light intensity information is at least one of optical signal mean, optical signal standard deviation, optical signal variance, and optical signal weight ratio.

In some possible implementation manners, the plurality of sub-regions have different locations and/or shapes.

In some possible implementation manners, the fingerprint logo includes at least one type of fingerprint logo.

In some possible implementation manners, the processing unit is further configured to:

determine the at least one first region according to location information of the fingerprint logo and current type of the fingerprint logo.

In some possible implementation manners, if there is not the fingerprint logo in the first image, the processing unit is further configured to control the optical sensor to capture a fingerprint image.

In some possible implementation manners, if there is the fingerprint logo in the first image, the acquiring unit is further configured to acquire second optical signals captured by the optical sensor in the at least one first region respectively, where the second optical signals captured in the at least one first region form a second image; and the processing unit is further configured to identify whether there is the fingerprint logo in the second image according to the second optical signals captured in the at least one first region.

In some possible implementation manners, the processing unit is a micro control unit (MCU) in a fingerprint module or a processor in an electronic device, where the fingerprint module includes the optical sensor.

In a third aspect, provided is an electronic device, including:

an optical sensor configured to capture an image; and a controller including a memory for storing programs and data and a processor for calling and running the programs and the data stored in the memory, where the controller is configured to:

execute the method in the above first aspect or any of the possible implementation manners of the first aspect.

In a fourth aspect, provided is a chip, where the chip includes an input/output interface, at least one processor, at least one memory and a bus. The at least one memory is configured to store an instruction. The at least one processor is configured to call the instruction in the at least one memory, to execute the method in the first aspect or any of the possible implementation manners of the first aspect.

In a fifth aspect, provided is an electronic device including the chip in the fourth aspect.

In a sixth aspect, provided is a computer storage medium having stored therein program codes, the program codes being operative to indicate execution of the method in the above first aspect or any of the possible implementation manners in the first aspect.

In a seventh aspect, provided is a computer program product including instructions which cause a computer to execute the method in the above first aspect or any of the possible implementation manners in the first aspect when run on the computer.

Based on the foregoing technical solutions, in a solution of identifying a fingerprint logo provided by an embodiment of the present disclosure, before an optical sensor captures a fingerprint image, a first image may be acquired by the optical sensor, and whether there is a fingerprint logo for guiding a user to perform pressing is identified in the first image, and then fingerprint image capturing is performed after the fingerprint logo is determined to disappear, thereby solving a problem that a fingerprint logo is contained in a fingerprint image, reducing a risk of false fingerprint identification, and meanwhile, reducing FRR and FAR.

Further, compared to a solution of a fixed delay to wait for a fingerprint logo to completely disappear, a solution of identifying a fingerprint logo provided by an embodiment of the present disclosure greatly improves response speed and system reliability, and improves user experience.

DESCRIPTION OF EMBODIMENTS

A clear description of technical solutions of embodiments of the present disclosure will be given below in combination with the accompanying drawings in the embodiments of the present disclosure.

As an electronic device enters an era of full screen, a fingerprint capturing region on the front of the electronic device is squeezed by the full screen, and therefore, under-display or under-screen fingerprint identification technology has gained an increasing attention. The under-screen fingerprint identification technology refers to mounting a fingerprint identification module under a display screen, so as to realize a fingerprint identification operation in a display region of the display screen without setting a fingerprint capturing region in a region other than the display region on the front of an electronic device.

Optical under-screen fingerprint identification technology uses light returned from a top surface of a display component of a device for fingerprint sensing and other sensing operations. The returned light carries information of an object (e.g., a finger) in contact with the top surface, and by capturing and detecting the returned light, a particular optical sensor module under a display screen is implemented. The optical sensor module may be designed to achieve desired optical imaging by properly configuring optical elements for capturing and detecting the returned light.

It should be understood that technical solutions of embodiments of the present disclosure can be applied to various electronic devices, for example, portable or mobile computing devices such as smart phones, notebook computers, tablet computers and game devices, and other electronic devices such as electronic databases, automobiles and automated teller machines (ATM), which is not limited in the embodiments of the present disclosure.

Figure 1:
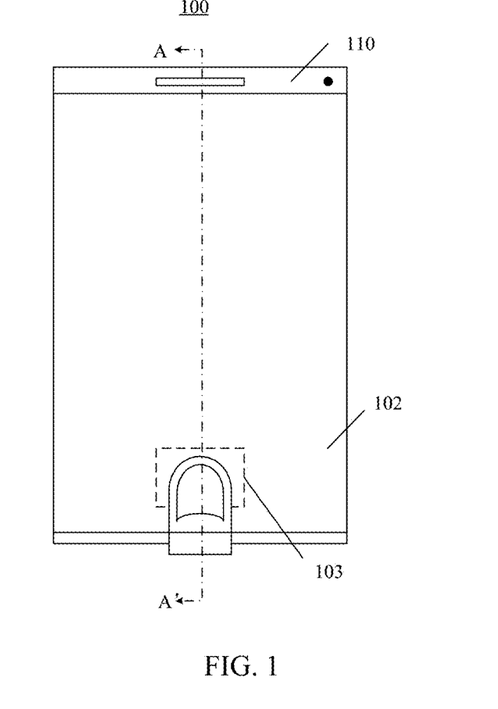
FIG. 1 is a schematic plan view of an electronic device to which the present disclosure is applicable.
Figure 2:
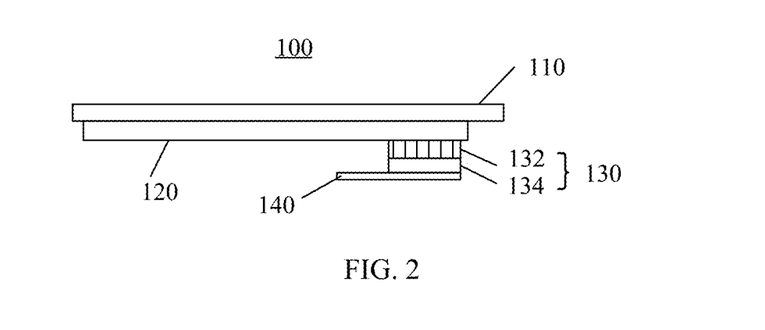
FIG. 2 is a partial schematic cross-sectional view of the electronic device shown in FIG. 1 taken along A-A'.

FIG. 1 and FIG. 2 are schematic views showing an electronic device 100 to which a fingerprint identification apparatus according to an embodiment of the present disclosure is applicable. FIG. 1 is a schematic front view of an electronic device 100, and FIG. 2 is a partial schematic cross-sectional structural view of the electronic device 100 shown in FIG. 1 taken along A-A'.

As shown in FIG. 1 and FIG. 2, the electronic device 100 includes a display screen 120 and an optical fingerprint identification apparatus (hereinafter referred to as a fingerprint identification apparatus in short) 130. The optical fingerprint identification apparatus 130 has one or more sensing arrays, and the sensing array(s) is/are disposed at least in a local region under the display screen 120 such that a fingerprint capturing region (or a sensing region) 103 of the optical fingerprint identification apparatus 130 is at least partially located in a display region 102 of the display screen 120.

It should be understood that an area of the fingerprint capturing region 103 may be different from an area of the sensing array of the optical fingerprint identification apparatus 130. For example, the area of the fingerprint capturing region 103 of the optical fingerprint identification apparatus 130 may be greater than the area of the sensing array of the optical fingerprint identification apparatus 130 through a lens imaging light path design, a reflective folding light path design or other light path designs such as light convergence or reflection. In other alternative implementation manners, if the light path is directed in a manner of light collimation for example, the area of the fingerprint capturing region 103 of the optical fingerprint identification apparatus 130 may also be designed to be substantially identical with the area of the sensing array of the optical fingerprint identification apparatus 130.

As shown in FIG. 1, the fingerprint capturing region 103 is located in the display region 102 of the display screen 120, and thus when a user needs to unlock or perform fingerprint verification on the electronic device, fingerprint input can be implemented as long as a finger is pressed on the fingerprint capturing region 103 located in the display screen 120. Since fingerprint detection can be implemented inside the screen, a front surface of the electronic device 100 in the foregoing structure does not need to specifically reserve a space to set a fingerprint button (such as a Home button), so that a full screen solution can be adopted, that is, the display region 102 of the display screen 120 can be substantially extended to the entire front surface of the electronic device 100.

In one embodiment, the display screen 120 may be a self-emitting display screen, which adopts a self-emitting display unit as a display pixel, such as an organic light-emitting diode (OLED) display screen or a micro light-emitting diode (Micro-LED) display screen. For example, in the case of an OLED display screen, the optical fingerprint identification apparatus 130 may utilize an OLED display unit (that is, an OLED light source) of the OLED display screen 120 that is located in the fingerprint capturing region 103 as an excitation light source for optical fingerprint detection.

In other embodiments, the optical fingerprint identification apparatus 130 may also use an internal light source or an external light source to provide an optical signal for fingerprint detection. In this case, the optical fingerprint identification apparatus 130 may be applied to a non-self-emitting display screen, such as a liquid crystal display screen or other passive light-emitting display screens. For example, in the case of application of a liquid crystal display screen having a backlight module and a liquid crystal panel, in order to support under-screen fingerprint detection of the liquid crystal display screen, an optical fingerprint system of the electronic device 100 may further include an excitation light source for optical fingerprint detection. The excitation light source may be specifically an infrared light source or a light source of non-visible light of a specific wavelength, which may be disposed under the backlight module of the liquid crystal display screen or disposed in an edge region under a protective cover of the electronic device 100. The optical fingerprint identification apparatus 130 may be disposed under the edge region of the liquid crystal panel or the protective cover, so that light for fingerprint detection can reach the optical fingerprint identification apparatus 130 by optical path directing. Alternatively, the optical fingerprint identification apparatus 130 may also be disposed under the backlight module, and the backlight module allows light for fingerprint detection to pass through the liquid crystal panel and the backlight module and reach the optical fingerprint identification apparatus 130 by providing a via hole or performing other optical designs on film layers such as a diffusion sheet, a brightening sheet, a reflection sheet, or the like.

Moreover, the sensing array of the optical fingerprint identification apparatus 130 may be specifically a photo detector array including a plurality of photo detectors arranged in an array, and the photo detectors may serve as optical sensing units as described above. When a finger touches, presses, or approaches (collectively referred to as touch in the present disclosure for convenience of description) the fingerprint capturing region 103, light emitted by a display unit of the fingerprint capturing region 103 is reflected by a fingerprint on a finger surface to form reflected light, where reflected light of a ridge of the fingerprint of the finger is different from that of a valley of the fingerprint of the finger, and the reflected light from the display screen 120 is received by the photo detector array and converted into a corresponding electrical signal, that is, a fingerprint detection signal. Fingerprint image data can be obtained based on the fingerprint detection signal, and fingerprint matching verification can be further performed, thereby implementing an optical fingerprint identification function in the electronic device 100.

It should be understood that in a specific implementation, the electronic device 100 may further include a transparent protective cover 110, and the cover 110 may specifically be a transparent cover, such as a glass cover or a sapphire cover, which is located on the display screen 120 and covers the front surface of the electronic device 100. Therefore, in the embodiment of the present disclosure, the so-called finger touching, pressing or approaching the display screen 120 may actually refer to the finger touching, pressing or approaching the cover 110 on the display screen 120 or a protective layer covering a surface of the cover 110. In addition, the electronic device 100 may further include a touch sensor, and the touch sensor may specifically be a touch panel, which may be disposed on a surface of the display screen 120 or may be partially or entirely integrated into an interior of the display screen 120, that is, the display screen 120 is specifically a touch control display screen.

As an alternative implementation manner, as shown in FIG. 2, the optical fingerprint identification apparatus 130 includes an optical detection unit 134 and an optical component 132. The optical detection unit 134 includes the sensing array, and a readout circuit electrically connected to the sensing array as well as other auxiliary circuits, and may be fabricated on a die by a semiconductor process. That is, the optical detection unit 134 may be fabricated on an optical imaging chip, an image sensing chip or an optical sensor chip. The optical component 132 may be disposed above the sensing array of the optical detection unit 134, and may specifically include a filter, a light path directing structure, and other optical elements. The filter may be used to filter ambient light passing through a finger, and the light path directing structure is mainly used to direct a light path such as collimating, modulating or converging light that propagates downward, thereby implementing directing of the reflected light reflected from the finger surface to the sensing array for optical detection.

In a specific implementation, the optical component 132 may be encapsulated in the same optical fingerprint chip with the optical detection unit 134, or the optical component 132 may be disposed outside a chip where the optical detection unit 134 is located, for example the optical component 132 is attached above the chip, or some elements of the optical component 132 are integrated into the chip. There are various implementations for the light path directing structure of the optical component 132, for example, a light path modulator or a light path collimator fabricated on a semiconductor silicon wafer or other substrates, and the light path modulator or the light path collimator has a plurality of light path modulating units or collimating units, which may be specifically micro-hole arrays. Alternatively, a light directing layer may also be an optical lens layer having one or more lens units, such as a lens group consisting of one or more aspherical lenses. After optically collimated or converged by the micro-hole arrays or the lens units, a reflected light reflected from a finger is received by the optical sensing units underneath, so that the sensing array may detect a fingerprint image of the finger.

A circuit board 140, for example, a flexible printed circuit (FPC), may further be provided under the optical fingerprint identification apparatus 130. The optical fingerprint identification apparatus 130 may be soldered to the circuit board 140 through a pad for example, and achieves electrical interconnection and signal transmission with other peripheral circuits or other elements of the electronic device 100 through the circuit board 140. For example, the optical fingerprint identification apparatus 130 may receive a control signal of a processing unit of the electronic device 100 through the circuit board 140, and may also output the fingerprint detection signal to the processing unit, a control unit or the like of the electronic device 100 through the circuit board 140.

As described above, when under-screen fingerprint identification is implemented based on the optical fingerprint identification apparatus 130, the display screen 120 may prompt a part to be pressed, mainly including two patterns: one is a fingerprint logo prompting a user to perform pressing, and the other is a pattern of a captured fingerprint image. If an optical fingerprint image contains logo information, FRR of fingerprint identification will be greatly affected. The presence of the fingerprint logo in the fingerprint image is due to the fact that the fingerprint logo does not completely disappear during an exposure process. At current stage, a method for eliminating a logo in a fingerprint image in an optical fingerprint is mainly to perform a fixed delay on a host side, and issue a fingerprint image capturing command after the fingerprint logo is completely eliminated. However, since the above method is a fixed delay method, a time point of fingerprint logo elimination cannot be accurately known, so user experience is reduced.

In order to solve the above technical problem, an embodiment of the present disclosure provides an improved technical solution. Specifically, a method for identifying a fingerprint logo is provided. Before starting to capture a fingerprint image normally, an image of a local region may be firstly captured to determine whether there is a fingerprint logo currently, thereby solving a problem of a fingerprint logo contained in a fingerprint image, reducing a risk of fingerprint identification, and meanwhile, reducing FRR.

Figure 3:
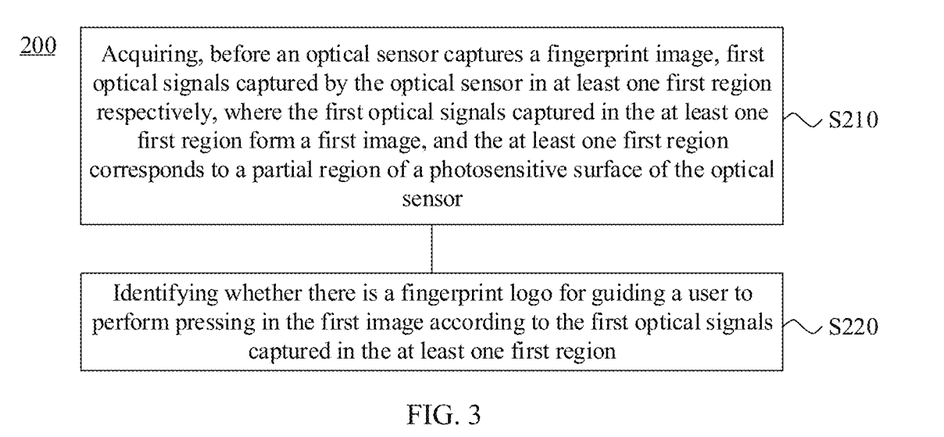
FIG. 3 is a schematic flowchart of a method for identifying a fingerprint logo according to an embodiment of the present disclosure.

FIG. 3 is a schematic flowchart of a method 200 for identifying a fingerprint logo according to an embodiment of the present disclosure. As shown in FIG. 3, the method 200 includes:

S210, acquiring, before an optical sensor captures a fingerprint image, first optical signals captured by the optical sensor in at least one first region respectively, where the first optical signals captured in the at least one first region form a first image, and the at least one first region corresponds to a partial region of a photosensitive surface of the optical sensor; and S220, identifying whether there is a fingerprint logo for guiding a user to perform pressing in the first image according to the first optical signals captured in the at least one first region.

It should be understood that, in the embodiment of the present disclosure, the method 200 may be executed by an electronic device. Specifically, the method 200 may be executed by a processor (such as a central processing unit (CPU)) in the electronic device. For example, the processor executes the method 200 through some software running on the electronic device. The method 200 may further be executed by a fingerprint identification module including at least one optical sensor. Specifically, the method 200 may be executed by an MCU in the fingerprint identification module. For example, the MCU may control the optical sensor to capture an optical signal (an image), and the MCU includes a memory for storing programs and data and a processor for calling and running the programs and the data stored in the memory, and the MCU is configured to execute the method 200. By adopting an MCU to execute a method for identifying a fingerprint logo, software intervening is not needed, so that fingerprint logo identification can be realized without upper layer application perception.

It should be noted that the memory included in the above MCU may be a register, and the register may store some related algorithms for calculating mean, variance, standard deviation, and weight ratio, and may also store some algorithms for selection of a first region location, and may also store some parameter configuration information. The above MCU may be integrated, for example, on an image processing chip, which may be used to optimize the optical sensor to capture an image.

It should be understood that the optical sensor in the embodiment of the present disclosure may correspond to the optical detection unit 134 in the optical fingerprint identification apparatus 130 in FIG. 1, and the method 200 may be applied to an optical fingerprint identification apparatus including a plurality of optical sensors, so as to achieve a large area of fingerprint identification.

Hereinafter, description is specifically made by an example that the method 200 is executed by an MCU.

It should be noted that the at least one first region corresponds to the partial region of the photosensitive surface of the optical sensor, that is, fingerprint logo identification may thus be implemented only through an image formed by an optical signal captured by an optical sensor in a local region, thereby improving user usage experience.

It should be understood that, by only acquiring the first optical signals captured by the optical sensor in the at least one first region respectively, reading of the first optical signals on the entire optical sensor is avoided, thereby improving rate of reading the sensor and rate of processing the first optical signals, and further, improving efficiency of identifying whether there is the fingerprint logo in the first image.

In an embodiment of the present disclosure, before capturing a fingerprint image formally, a first image may be acquired by an optical sensor, and whether there is a fingerprint logo for guiding a user to perform pressing is identified in the first image, and then fingerprint image capturing is performed after the fingerprint logo is determined to disappear, thereby solving a problem that a fingerprint logo is contained in a fingerprint image, reducing a risk of false fingerprint identification, and meanwhile, reducing FRR.

It should be noted that the first optical signals may bear fingerprint information or may not bear fingerprint information. That is, the first image may carry fingerprint information or may not carry fingerprint information.

Figure 4:
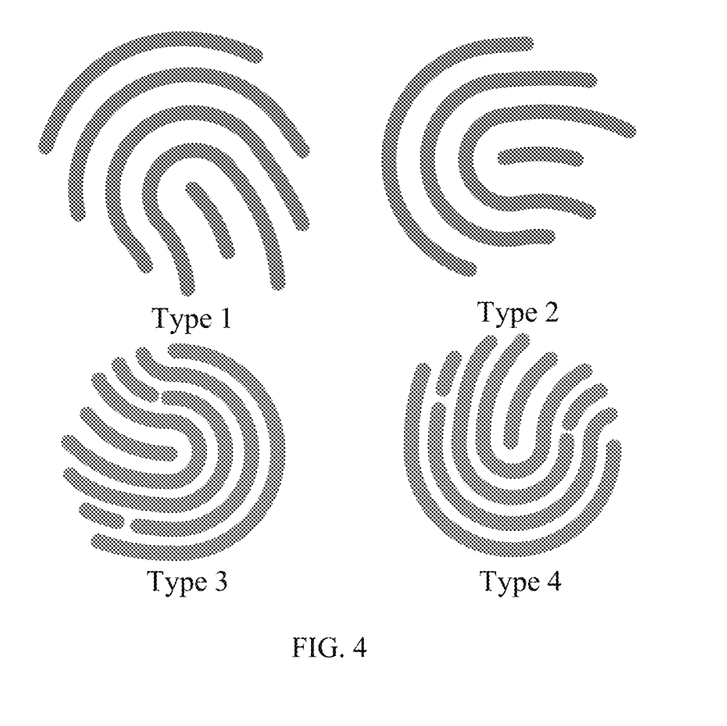
FIG. 4 is a schematic diagram of multiple types of fingerprint logos according to an embodiment of the present disclosure.

Optionally, in some embodiments, the MCU may identify whether there is at least one type of fingerprint logo in the first image. For example, the MCU may identify whether there are four different types of fingerprint logos as shown in FIG. 4 in the first image.

It should be understood that different electronic devices or different models of the same electronic device may have different types of fingerprint logos, and even an electronic device of the same model may also have different types of fingerprint logos. That is, the method for identifying the fingerprint logo in the embodiment of the present disclosure may be compatible with fingerprint logos of different electronic devices, and may also be compatible with fingerprint logos of different models of the same electronic device, and may be adjusted based on an actual type of fingerprint logo of a different model, thereby improving user experience.

Optionally, in some embodiments, the MCU may determine the at least one first region according to location information of the fingerprint logo and current type of the fingerprint logo.

It should be understood that the MCU can easily know the location information of the fingerprint logo and the current type of the fingerprint logo.

For example, in combination with some specific location algorithms, and based on location information of the fingerprint logo and current type of the fingerprint logo, the MCU can determine the at least one first region.

Optionally, in some embodiments, the MCU may identify whether there is the fingerprint logo for guiding the user to perform pressing in the first image from the level of the first region according to the first optical signals captured in the at least one first region.

Specifically, the MCU determines light intensity information of the at least one first region respectively according to the first optical signals captured in the at least one first region. Further, if there is light intensity information greater than a first threshold in the light intensity information of the at least one first region, the MCU determines that there is the fingerprint logo in the first image; or if there is not light intensity information greater than a first threshold in the light intensity information of the at least one first region, the MCU determines that there is not the fingerprint logo in the first image.

It should be noted that, as long as there is light intensity information greater than the first threshold in any one of the at least one first region, the MCU determines that there is the fingerprint logo in the first image.

Optionally, before the MCU determines the light intensity information of the at least one first region respectively, the MCU performs consistency and/or binarization processing on the first optical signals captured in the at least one first region.

It should be noted that, by performing consistency and/or binarization processing on the first optical signals captured in the at least one first region, the first image can be optimized, thereby making it easier to identify whether there is the fingerprint logo in the first image.

Optionally, the light intensity information is at least one of optical signal mean, optical signal standard deviation, optical signal variance, and optical signal weight ratio.

Figure 5:
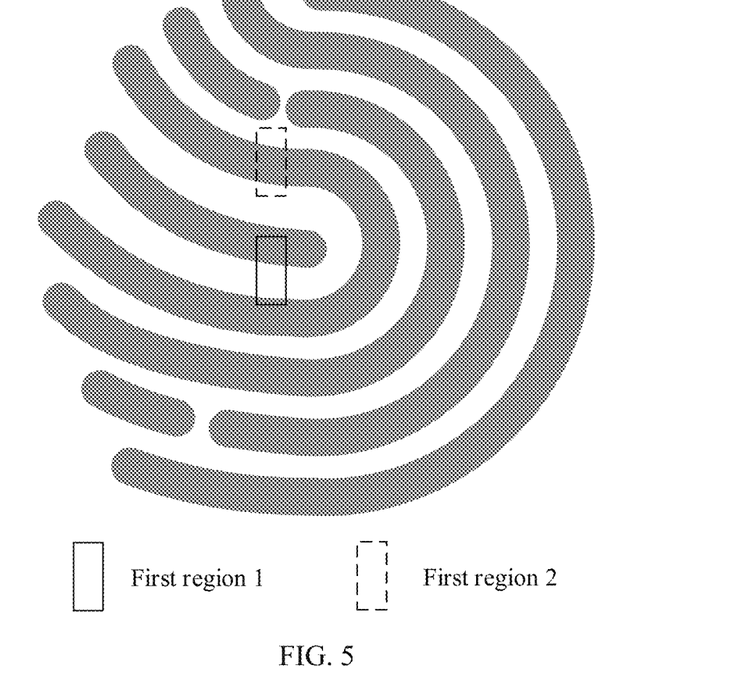
FIG. 5 is a schematic diagram of two first regions according to an embodiment of the present disclosure.

As shown in FIG. 5, it is assumed that there are a first region 1 and a first region 2. For example, optical signal mean of the first region 1 is A, and optical signal mean of the first region 2 is B; and mean of all first optical signals captured in the first region 1 is thus solved as A, and mean of all first optical signals captured in the first region 2 is thus solved as B. For another example, optical signal standard deviation of the first region 1 is C, and optical signal standard deviation of the first region 2 is D; and standard deviation of all first optical signals captured in the first region 1 is thus solved as C, and standard deviation of all first optical signals captured in the first region 2 is thus solved as D. For yet another example, optical signal variance of the first region 1 is E, and optical signal variance of the first region 2 is F; and variance of all first optical signals captured in the first region 1 is thus solved as E, and variance of all first optical signals captured in the first region 2 is thus solved as F. For yet another example, optical signal weight ratio of the first region 1 is X, optical signal weight ratio of the first region 2 is Y, mean of all first optical signals captured in the first region 1 is A, and ratio of an optical signal of which mean is greater than A in all first optical signals captured in the first region 1 is thus X; and mean of all first optical signals captured in the first region 2 is B, and ratio of an optical signal of which mean is greater than B in all first optical signals captured in the first region 2 is thus Y.

It should be noted that, in FIG. 5, a graphic presented by a shadow is a fingerprint logo.

Optionally, the MCU may configure the first threshold. For example, different first thresholds may be configured for different information included in the light intensity information. For another example, different first thresholds may be configured for different types of fingerprint logos.

Therefore, in the embodiment of the present disclosure, fingerprint logo identification can be implemented through a relationship between light intensity information of at least one first region and a first threshold.

Optionally, in some embodiments, the MCU may identify whether there is the fingerprint logo for guiding the user to perform pressing in the first image from the level of the first region based on the first optical signals captured in the at least one first region.

Specifically, the MCU divides each first region into a plurality of sub-regions, and each of the sub-regions corresponds to a plurality of pixel points of the optical sensor. Further, the MCU determines difference information between different sub-regions of the plurality of sub-regions according to the first optical signals of each of the sub-regions, and identifies whether there is the fingerprint logo in the first image according to the difference information between the different sub-regions of the plurality of sub-regions.

It should be understood that each of the sub-regions corresponds to a plurality of pixel points, and each of the pixel points captures a first optical signal, that is, first optical signals are captured in each of the sub-regions.

Optionally, the MCU may determine difference information between different sub-regions in the plurality of sub-regions by the following manners.

The MCU determines light intensity information of each of the sub-regions according to the first optical signals of each of the sub-regions, and determines the difference information between the different sub-regions of the plurality of sub-regions according to the light intensity information of each of the sub-regions.

It should be noted that the MCU may identify whether there is the fingerprint logo in the first image through the difference information between the different sub-regions in the first region. Certainly, fingerprint logo identification is performed in each of the at least one first region, and it can be confirmed that there is a fingerprint logo in the first image as long as the fingerprint logo is identified in any first region.

Optionally, before the MCU determines the light intensity information of each of the sub-regions, the MCU may further perform consistency and/or binarization processing on the first optical signals captured in the plurality of sub-regions.

It should be noted that, by performing consistency and/or binarization processing on the first optical signals captured in the plurality of sub-regions, the first image can be optimized, thereby making it easier to identify whether there is the fingerprint logo in the first image.

Optionally, the light intensity information is at least one of optical signal mean, optical signal standard deviation, optical signal variance, and optical signal weight ratio.

Figure 6:
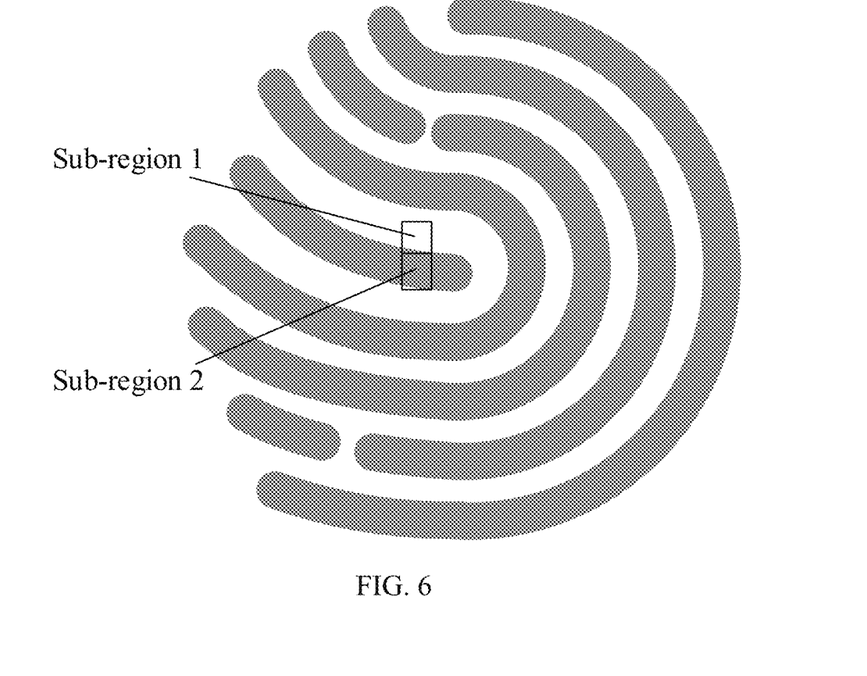
FIG. 6 is a schematic diagram of two sub-regions according to an embodiment of the present disclosure.

As shown in FIG. 6, it is assumed that the first region is divided into a sub-region 1 and a sub-region 2. For example, optical signal mean of the sub-region 1 is A, and optical signal mean of the sub-region 2 is B; and mean of all first optical signals captured in the sub-region 1 is thus solved as A, and mean of all first optical signals captured in the sub-region 2 is thus solved as B. For another example, optical signal standard deviation of the sub-region 1 is C, and optical signal standard deviation of the sub-region 2 is D; and standard deviation of all first optical signals captured in the sub-region 1 is thus solved as C, and standard deviation of all first optical signals captured in the sub-region 2 is thus solved as D. For yet another example, optical signal variance of the sub-region 1 is E, and optical signal variance of the sub-region 2 is F; and variance of all first optical signals captured in the sub-region 1 is thus solved as E, and variance of all first optical signals captured in the sub-region 2 is thus solved as F. For yet another example, optical signal weight ratio of the sub-region 1 is X, optical signal weight ratio of the sub-region 2 is Y, mean of all first optical signals captured in the sub-region 1 is A, and mean of all first optical signals captured in the sub-region 2 is B; and ratio of an optical signal of which mean is greater than A in all first optical signals captured in the sub-region 1 is thus X, and ratio of an optical signal of which mean is greater than B in all first optical signals captured in the sub-region 2 is thus Y.

It should be noted that, in FIG. 6, a graphic presented by a shadow is a fingerprint logo.

Optionally, the plurality of sub-regions have different locations and/or shapes.

Figure 7:
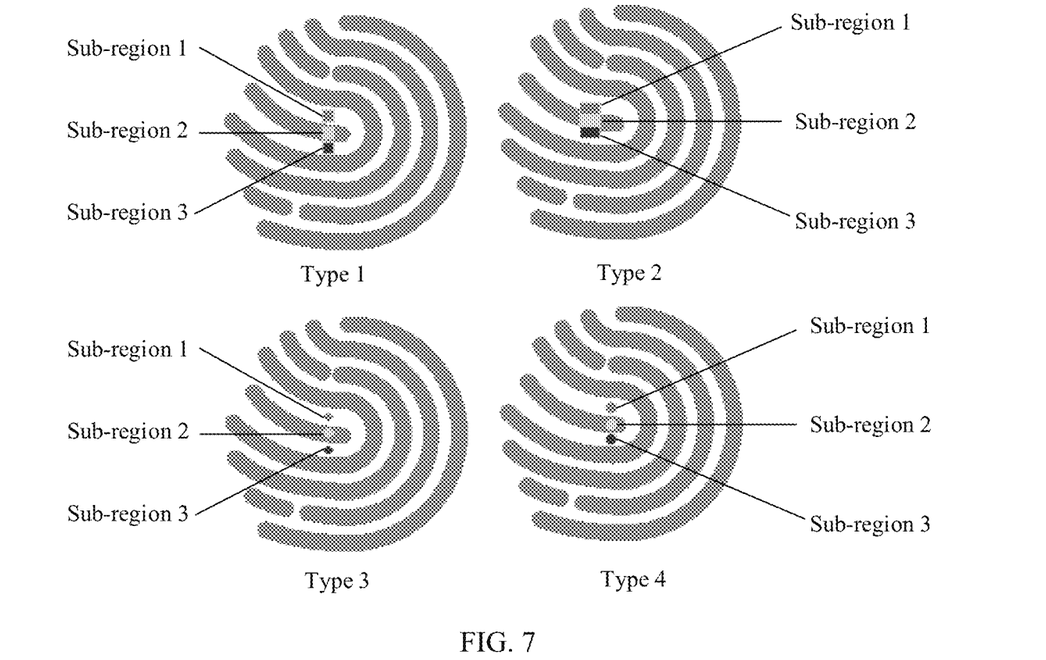
FIG. 7 is a schematic diagram of different shapes of a plurality of sub-regions according to an embodiment of the present disclosure.

For example, as shown in FIG. 7, the first region may be divided into a sub-region 1, a sub-region 2, and a sub-region 3, and the sub-region 1, the sub-region 2, and the sub-region 3 have four different shapes.

Figure 8:
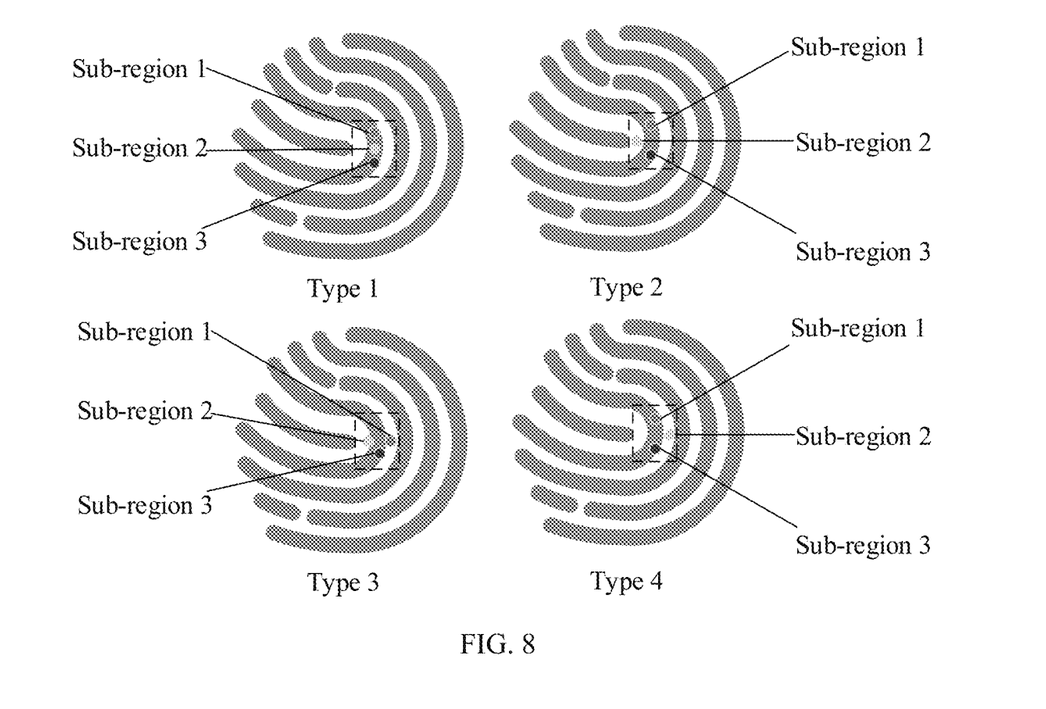
FIG. 8 is a schematic diagram of different locations of a plurality of sub-regions according to an embodiment of the present disclosure.

For another example, as shown in FIG. 8, the first region may be divided into a sub-region 1, a sub-region 2, and a sub-region 3, and the sub-region 1, the sub-region 2, and the sub-region 3 have four different locations.

Optionally, in some embodiments, if there is not the fingerprint logo in the first image, the MCU controls the optical sensor to capture a fingerprint image.

Optionally, in some embodiments, if there is the fingerprint logo in the first image, the MCU acquires second optical signals captured by the optical sensor in the at least one first region respectively, where the second optical signals captured in the at least one first region form a second image; and the MCU identifies whether there is the fingerprint logo in the second image according to the second optical signals captured in the at least one first region.

That is, if it is identified that there is the fingerprint logo in the current image, the MCU needs to re-execute related operations such as image capturing and fingerprint logo identification until the fingerprint logo disappears.

It should be noted that, in the solution in which the MCU recaptures the second optical signals and identifies whether there is the fingerprint logo in the second image, the at least one first region may be re-determined, and the second optical signals are captured respectively based on the re-determined at least one first region.

Therefore, in the embodiment of the present disclosure, fingerprint logo disappearing time can be accurately determined, thereby avoiding a fingerprint logo contained in a captured fingerprint image, reducing a risk of false fingerprint identification, and meanwhile, reducing FRR.

Figure 9:
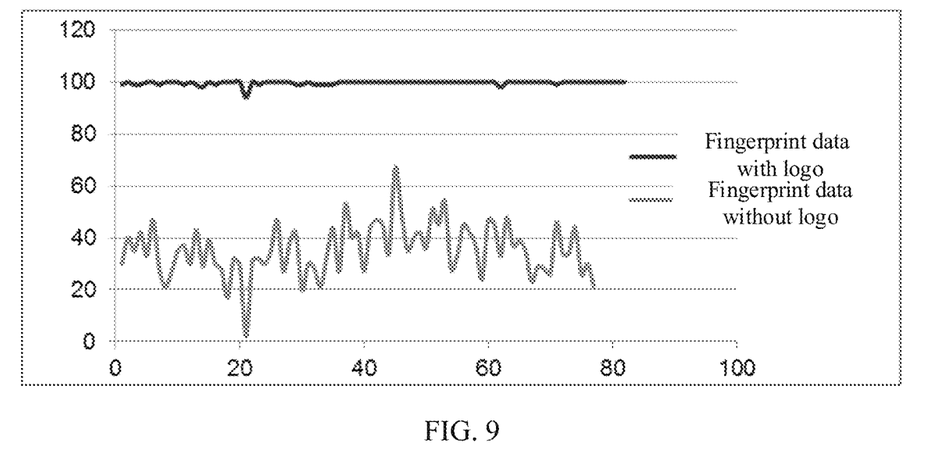
FIG. 9 is a schematic diagram of weight ratio analysis results according to an embodiment of the present disclosure.

Optionally, as an example, as shown in FIG. 9, when the light intensity information is optical signal weight ratio, a weight analysis method can clearly distinguish fingerprint data with a fingerprint logo and fingerprint data without a fingerprint logo. Specifically, as shown in FIG. 9, in a first region, 78 pixel points are included, optical signals captured thereby are respectively identified as 1-78, and weight ratio analysis is performed on the optical signals captured by the 78 pixel points respectively. It can be seen that weight ratio of fingerprint data with a fingerprint logo is almost maintained at 100, while weight ratio of fingerprint data without a fingerprint logo is largely fluctuated, and the weight ratio is maintained in a range of 0-70.

Optionally, as an example, as shown in the following Table 1, by executing the method for identifying the fingerprint logo of the embodiment of the present disclosure, performance analysis is performed on pure fingerprint data and fingerprint data with a fingerprint logo. When an image of pure fingerprint data is identified by the method for identifying the fingerprint logo of the embodiment of the present disclosure, there are 3 times of misjudgment in 4463 times, that is, it is judged that there is a fingerprint logo for 3 times out of 4463 times. When an image of fingerprint data with a fingerprint logo is identified by the method for identifying the fingerprint logo of the embodiment of the present disclosure, there are 0 time of misjudgment in 193 times, that is, the fingerprint logo can be accurately judged every time.

TABLE 1

| Sample attribute | Identification result (misjudgment/total) |
| --- | --- |
| Pure fingerprint data | 3/4463 |
| Fingerprint data with fingerprint logo | 0/193 |

Figure 10:
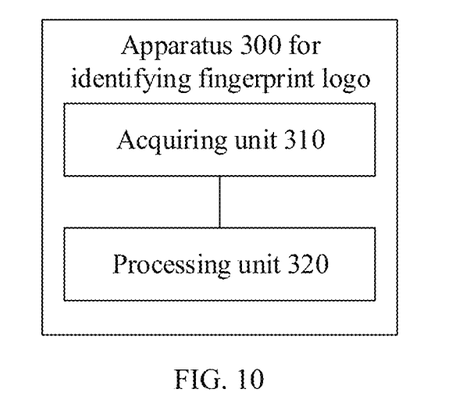
FIG. 10 is a schematic block diagram of an apparatus for identifying a fingerprint logo according to an embodiment of the present disclosure.

FIG. 10 is a schematic block diagram of an apparatus 300 for identifying a fingerprint logo according to an embodiment of the present disclosure. As shown in FIG. 10, the apparatus 300 for identifying the fingerprint logo includes:

an acquiring unit 310, configured to acquire, before an optical sensor captures a fingerprint image, first optical signals captured by the optical sensor in at least one first region respectively, where the first optical signals captured in the at least one first region form a first image, and the at least one first region corresponds to a partial region of a photosensitive surface of the optical sensor; and a processing unit 320, configured to identify whether there is a fingerprint logo for guiding a user to perform pressing in the first image according to the first optical signals captured in the at least one first region.

In some possible implementation manners, the processing unit 320 is configured to:

determine light intensity information of the at least one first region respectively according to the first optical signals captured in the at least one first region; and determine that there is the fingerprint logo in the first image if there is light intensity information greater than a first threshold in the light intensity information of the at least one first region; or determine that there is not the fingerprint logo in the first image if there is not light intensity information greater than a first threshold in the light intensity information of the at least one first region.

In some possible implementation manners, before the processing unit 320 determines the light intensity information of the at least one first region respectively, the processing unit 320 is further configured to:

perform consistency and/or binarization processing on the first optical signals captured in the at least one first region.

In some possible implementation manners, the light intensity information is at least one of optical signal mean, optical signal standard deviation, optical signal variance, and optical signal weight ratio.

In some possible implementation manners, the processing unit 320 is further configured to configure the first threshold.

In some possible implementation manners, the processing unit 320 is further configured to divide each first region into a plurality of sub-regions, where each of the sub-regions corresponds to a plurality of pixel points of the optical sensor; and the processing unit 320 is configured to:

determine difference information between different sub-regions of the plurality of sub-regions according to the first optical signals of each of the sub-regions; and identify whether there is the fingerprint logo in the first image according to the difference information between the different sub-regions of the plurality of sub-regions.

In some possible implementation manners, the processing unit 320 is configured to:

determine light intensity information of each of the sub-regions according to the first optical signals of each of the sub-regions; and determine the difference information between the different sub-regions of the plurality of sub-regions according to the light intensity information of each of the sub-regions.

In some possible implementation manners, before the processing unit 320 determines the light intensity information of each of the sub-regions, the processing unit 320 is further configured to perform consistency and/or binarization processing on the first optical signals captured in the plurality of sub-regions.

In some possible implementation manners, the light intensity information is at least one of optical signal mean, optical signal standard deviation, optical signal variance, and optical signal weight ratio.

In some possible implementation manners, the plurality of sub-regions have different locations and/or shapes.

In some possible implementation manners, the fingerprint logo includes at least one type of fingerprint logo.

In some possible implementation manners, the processing unit 320 is further configured to:

determine the at least one first region according to location information of the fingerprint logo and current type of the fingerprint logo.

In some possible implementation manners, if there is not the fingerprint logo in the first image, the processing unit is further configured to control the optical sensor to capture a fingerprint image.

In some possible implementation manners, if there is the fingerprint logo in the first image, the acquiring unit 310 is further configured to acquire second optical signals captured by the optical sensor in the at least one first region respectively, where the second optical signals captured in the at least one first region form a second image; and the processing unit 320 is further configured to identify whether there is the fingerprint logo in the second image according to the second optical signals captured in the at least one first region.

In some possible implementation manners, the processing unit 320 is a micro control unit (MCU) in a fingerprint module or a processor in an electronic device, where the fingerprint module includes an optical sensor.

Figure 11:
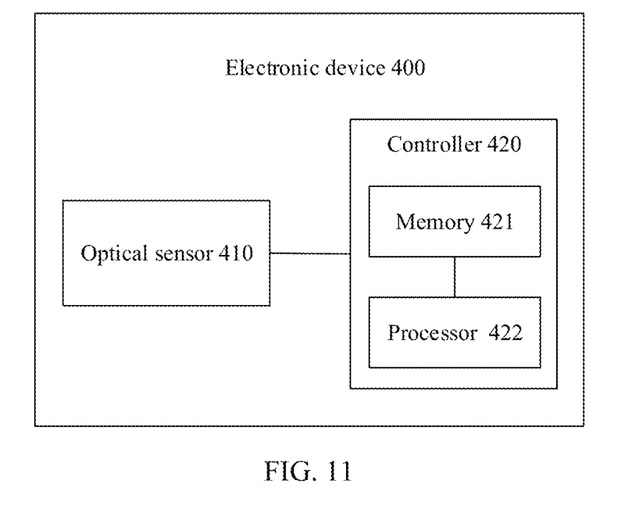
FIG. 11 is a schematic block diagram of an electronic device according to an embodiment of the present disclosure.

FIG. 11 is a schematic block diagram of an electronic device 400 according to an embodiment of the present disclosure. As shown in FIG. 11, the electronic device 400 includes:

an optical sensor 410 configured to capture an image; and a controller 420 including a memory 421 for storing programs and data and a processor 422 for calling and running the programs and the data stored in the memory, where the controller 420 is configured to:

execute the method as shown in the above FIG. 3 to FIG. 9.

It should be understood that the processor of the embodiment of the present disclosure may be an integrated circuit chip with signal processing capability. In an implementation process, steps of the foregoing method embodiments may be completed by using an integrated logical circuit of hardware in the processor or an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and the logical block diagrams disclosed in the embodiments of the present disclosure can be implemented or executed. The general purpose processor may be a microprocessor or the processor may be any conventional processor or the like. Steps of the methods disclosed in the embodiments of the present disclosure may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps of the foregoing method in combination with hardware of the processor.

It is appreciated that, a terminal or an electronic device in an embodiment of the present disclosure may further include a memory; the memory may be either volatile memory or nonvolatile memory, or may include both volatile and non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and used as an external cache. By way of example and not limitation, RAMs of many forms are available, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). It should be noted that the memory in the system and method described in this specification aims to include but is not limited to these memories and any memory of another proper type.

An embodiment of the present disclosure further provides a computer readable storage medium, where the computer readable storage medium stores one or more programs, and the one or more programs include an instruction. When the instruction is executed by a portable electronic device that includes a plurality of application programs, the portable electronic device can execute the method in the embodiments shown in FIG. 3 to FIG. 9.

The embodiment of the present disclosure also provides a computer program including instructions that, when executed by a computer, cause the computer to execute the method of the embodiments shown in FIG. 3 to FIG. 9.

An embodiment of the present disclosure further provides a chip including an input and output interface, at least one processor, at least one memory and a bus, where the at least one memory is configured to store an instruction, the at least one processor is configured to call an instruction in the at least one memory to execute the method of the embodiments shown in FIG. 3 to FIG. 9.

It should be understood that, in various embodiments of the present disclosure, values of sequence numbers of the above-mentioned various processes do not mean an order of execution which should be determined based upon functionalities and internal logics thereof, rather than setting any limitation to implementation of the embodiment of the present disclosure.

Those of ordinary skill in the art may be aware that, units and algorithm steps of the examples described in the embodiments disclosed in this paper may be implemented by electronic hardware, or a combination of computer software and the electronic hardware. Whether these functions are executed in hardware or software mode depends on the specific applications and design constraint conditions of the technical solution. Those skilled may implement the described functions by using different methods for each specific application, but this implementation should not be considered to be beyond the scope of the present disclosure.

Those skilled in the art to which the present disclosure pertains may clearly understand that, for convenience and simplicity of description, the specific working processes of the system, the apparatus and the units described above may refer to corresponding processes in the foregoing method embodiments, and will not be repeated redundantly herein.

In the several embodiments provided in the present disclosure, it should be understood that the disclosed system, apparatus, and method may be implemented in another manner. For example, the described apparatus embodiment is merely an example. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on multiple network units. Part of or all of the units here may be selected according to a practical need to achieve the objectives of the solutions of the embodiments of the present disclosure.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes a variety of media capable of storing program codes, such as a USB disk, a mobile hard disk, a read-only memory (ROM), a random access memory (RAM), a magnetic disk, an optical disk.

Described above are the specific embodiments of the present disclosure only, but the protection scope of present disclosure is not limited thereto, those skilled who are familiar with the art could readily think of variations or substitutions within the technical scope disclosed by the present disclosure, and these variations or substitutions shall fall within the protection scope of the present disclosure. Therefore, the protection scope of this application shall be subject to the protection scope of the claims.

What is claimed is:

1. A method for identifying a fingerprint logo, comprising:
   acquiring, before an optical sensor captures a fingerprint image, first optical signals captured by the optical sensor in at least one first region respectively, wherein the first optical signals captured in the at least one first region form a first image, and the at least one first region corresponds to a partial region of a photosensitive surface of the optical sensor; and
   identifying whether there is a fingerprint logo for guiding a user to perform pressing in the first image according to the first optical signals captured in the at least one first region.

2. The method according to claim 1, wherein the identifying whether there is the fingerprint logo for guiding the user to perform pressing in the first image according to the first optical signals captured in the at least one first region comprises:
   determining light intensity information of the at least one first region respectively according to the first optical signals captured in the at least one first region; and
   determining that there is the fingerprint logo in the first image if there is light intensity information greater than a first threshold in the light intensity information of the at least one first region; or
   determining that there is not the fingerprint logo in the first image if there is not light intensity information greater than a first threshold in the light intensity information of the at least one first region.

3. The method according to claim 2, wherein before determining the light intensity information of the at least one first region respectively, the method further comprises:
   performing consistency and/or binarization processing on the first optical signals captured in the at least one first region.

4. The method according to claim 2, wherein the light intensity information is at least one of optical signal mean, optical signal standard deviation, optical signal variance, and optical signal weight ratio.

5. The method according to claim 2, wherein the method further comprises: configuring the first threshold.

6. The method according to claim 1, wherein the method further comprises:
   dividing each first region into a plurality of sub-regions, wherein each of the sub-regions corresponds to a plurality of pixel points of the optical sensor; and
   the identifying whether there is the fingerprint logo for guiding the user to perform pressing in the first image according to the first optical signals captured in the at least one first region comprises:
   determining difference information between different sub-regions of the plurality of sub-regions according to the first optical signals of each of the sub-regions; and
   identifying whether there is the fingerprint logo in the first image according to the difference information between the different sub-regions of the plurality of sub-regions.

7. The method according to claim 6, wherein the determining the difference information between the different sub-regions of the plurality of sub-regions according to the first optical signals of each of the sub-regions comprises:
   determining light intensity information of each of the sub-regions according to the first optical signals of each of the sub-regions; and
   determining the difference information between the different sub-regions of the plurality of sub-regions according to the light intensity information of each of the sub-regions.

8. The method according to claim 7, wherein before determining the light intensity information of each of the sub-regions, the method further comprises:
performing consistency and/or binarization processing on the first optical signals captured in the plurality of sub-regions.

9. The method according to claim 7, wherein the light intensity information is at least one of optical signal mean, optical signal standard deviation, optical signal variance, and optical signal weight ratio.

10. The method according to claim 6, wherein the plurality of sub-regions have different locations and/or shapes.

11. The method according to claim 1, wherein the fingerprint logo comprises at least one type of fingerprint logo.

12. The method according to claim 11, wherein the method further comprises:
determining the at least one first region according to location information of the fingerprint logo and current type of the fingerprint logo.

13. The method according to claim 1, wherein if there is not the fingerprint logo in the first image, the method further comprises:
controlling the optical sensor to capture a fingerprint image.

14. The method according to claim 1, wherein if there is the fingerprint logo in the first image, the method further comprises:
acquiring second optical signals captured by the optical sensor in the at least one first region respectively, wherein the second optical signals captured in the at least one first region form a second image; and
identifying whether there is the fingerprint logo in the second image according to the second optical signals captured in the at least one first region.

15. An apparatus for identifying a fingerprint logo, comprising:
an acquiring unit, configured to acquire, before an optical sensor captures a fingerprint image, first optical signals captured by the optical sensor in at least one first region respectively, wherein the first optical signals captured in the at least one first region form a first image, and the at least one first region corresponds to a partial region of a photosensitive surface of the optical sensor; and
a processing unit, configured to identify whether there is a fingerprint logo for guiding a user to perform pressing in the first image according to the first optical signals captured in the at least one first region.

16. The apparatus according to claim 15, wherein the processing unit is configured to:
determine light intensity information of the at least one first region respectively according to the first optical signals captured in the at least one first region; and
determine that there is the fingerprint logo in the first image if there is light intensity information greater than a first threshold in the light intensity information of the at least one first region; or
determine that there is not the fingerprint logo in the first image if there is not light intensity information greater than a first threshold in the light intensity information of the at least one first region.

17. The apparatus according to claim 15, wherein the processing unit is further configured to divide each first region into a plurality of sub-regions, wherein each of the sub-regions corresponds to a plurality of pixel points of the optical sensor; and
the processing unit is configured to:
determine difference information between different sub-regions of the plurality of sub-regions according to the first optical signals of each of the sub-regions; and
identify whether there is the fingerprint logo in the first image according to the difference information between the different sub-regions of the plurality of sub-regions.

18. The apparatus according to claim 17, wherein the processing unit is configured to:
determine light intensity information of each of the sub-regions according to the first optical signals of each of the sub-regions; and
determine the difference information between the different sub-regions of the plurality of sub-regions according to the light intensity information of each of the sub-regions.

19. The apparatus according to claim 15, wherein the processing unit is further configured to:
determine the at least one first region according to location information of the fingerprint logo and current type of the fingerprint logo.

20. The apparatus according to claim 15, wherein if there is not the fingerprint logo in the first image, the processing unit is further configured to control the optical sensor to capture a fingerprint image.

* * * * *